United States Patent [19]
MacCready, Jr. et al.

[11] Patent Number: 5,758,735
[45] Date of Patent: Jun. 2, 1998

[54] HIGH PERFORMANCE BICYCLE PROPULSION

[75] Inventors: Paul B. MacCready, Jr., Pasadena; William J. Nicoloff, Northridge, both of Calif.

[73] Assignee: Aerovironment, Inc., Monrovia, Calif.

[21] Appl. No.: 672,219

[22] Filed: Jul. 26, 1996

[51] Int. Cl.$^6$ .................................................. B62M 23/02
[52] U.S. Cl. .......................... 180/206; 474/111; 474/119; 474/140; 474/206
[58] Field of Search .................................. 180/205, 206, 180/207, 220, 65.2; 280/236, 238, 259, 260, 261, 284; 474/111, 112, 119, 122, 138, 140, 155, 159, 160, 206, 152, 153, 164, 131, 133

[56] References Cited

U.S. PATENT DOCUMENTS

| | | |
|---|---|---|
| D. 342,926 | 1/1994 | Russell . |
| 515,004 | 2/1894 | Loomis ................................. 474/206 |
| 684,882 | 10/1901 | Taylor . |
| 1,321,978 | 11/1919 | Canfield ............................... 180/206 |
| 2,703,019 | 3/1955 | Burawoy . |
| 3,192,772 | 7/1965 | Tarter . |
| 3,618,418 | 11/1971 | Chittenden ........................... 474/153 |
| 3,767,195 | 10/1973 | Dimick . |
| 3,921,741 | 11/1975 | Garfinkle et al. . |
| 3,921,745 | 11/1975 | McCulloch et al. . |
| 3,939,932 | 2/1976 | Rosen . |
| 3,991,843 | 11/1976 | Davidson . |
| 4,085,814 | 4/1978 | Davidson et al. . |
| 4,122,907 | 10/1978 | Davidson et al. . |
| 4,168,758 | 9/1979 | Holt . |
| 4,221,275 | 9/1980 | Pennebaker et al. . |
| 4,364,448 | 12/1982 | Ikuma ................................... 180/206 |
| 4,678,454 | 7/1987 | Gall . |
| 5,000,724 | 3/1991 | Reid ..................................... 474/111 |
| 5,021,033 | 6/1991 | Sundstrom . |
| 5,024,286 | 6/1991 | Lean et al. . |
| 5,031,455 | 7/1991 | Cline . |
| 5,242,028 | 9/1993 | Murphy et al. . |
| 5,257,540 | 11/1993 | Bower et al. . |
| 5,266,066 | 11/1993 | White .................................... 474/111 |
| 5,308,290 | 5/1994 | Gesenhues ............................ 474/152 |
| 5,354,085 | 10/1994 | Gally .................................... 280/285 |
| 5,366,417 | 11/1994 | Shimaya . |
| 5,370,200 | 12/1994 | Takata . |
| 5,375,676 | 12/1994 | Takata et al. . |
| 5,397,280 | 3/1995 | Skuraka . |
| 5,518,458 | 5/1996 | Liu . |

FOREIGN PATENT DOCUMENTS

| | | |
|---|---|---|
| 0675037A1 | 8/1975 | European Pat. Off. . |
| 0867657 | 11/1941 | France ................................. 180/206 |
| 2259741 | 8/1975 | France . |
| 2411302 | 8/1979 | France . |
| 274491 | 9/1988 | Japan . |
| 5676590 | 3/1990 | Japan . |
| 404244496 | 9/1992 | Japan ................................... 180/206 |
| 227543 | 8/1994 | Taiwan . |
| 267137 | 1/1996 | Taiwan . |
| 275867 | 5/1996 | Taiwan . |
| 276230 | 5/1996 | Taiwan . |
| 1559822 | 1/1980 | United Kingdom .................. 180/206 |

*Primary Examiner*—Anne Marie Boehler
*Attorney, Agent, or Firm*—William W. Haefliger

[57] ABSTRACT

For use in determination of chain transmitted power, the combination comprising a tensioned chain having a succession of chain links with undulating edges; an idler supported to be driven in rotation by the chain, and having an undulating perimeter surface having a sine wave configuration and whose width dimension exceeds the width dimension between outermost chain surfaces; and certain of the chain undulating edges engaging portions of the idler undulating perimeter surfaces, whereby the chain changes direction as it travels lengthwise relative to the idler and rotatably drives the idler.

31 Claims, 4 Drawing Sheets

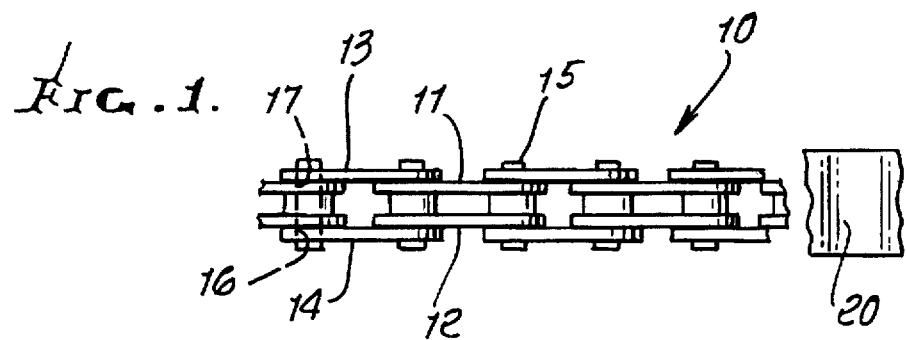
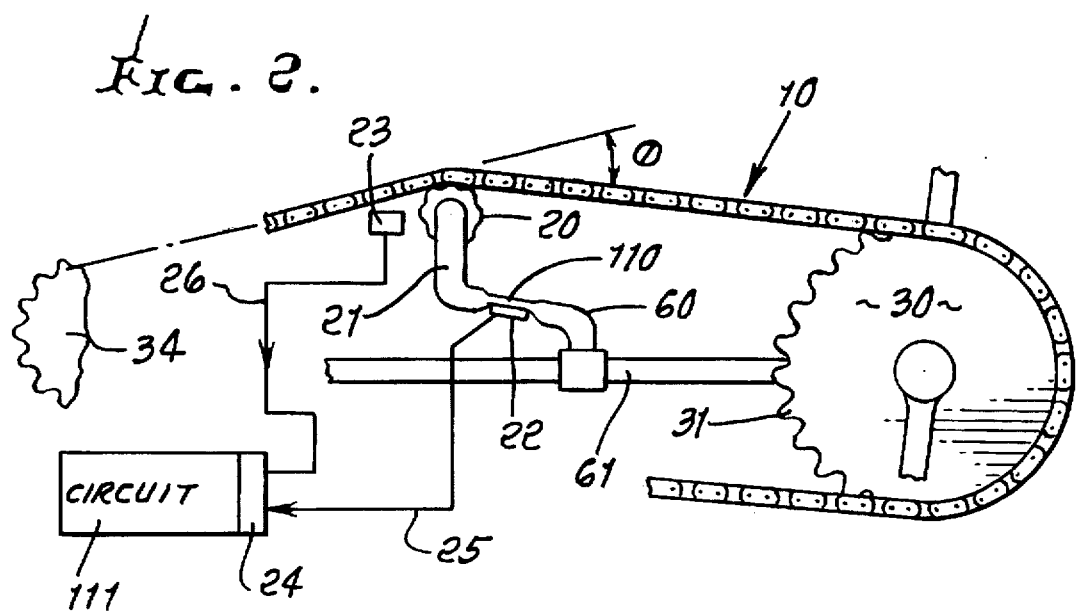
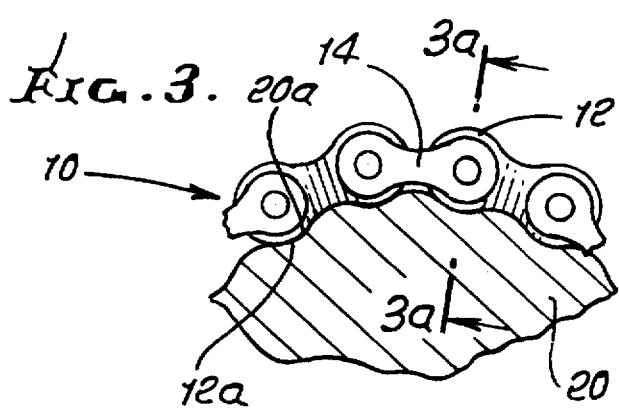
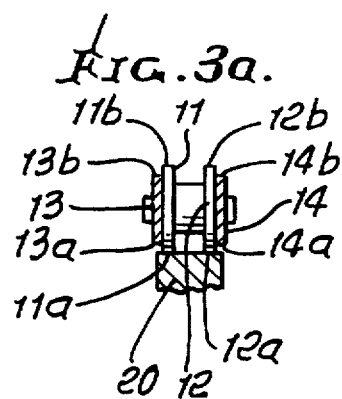

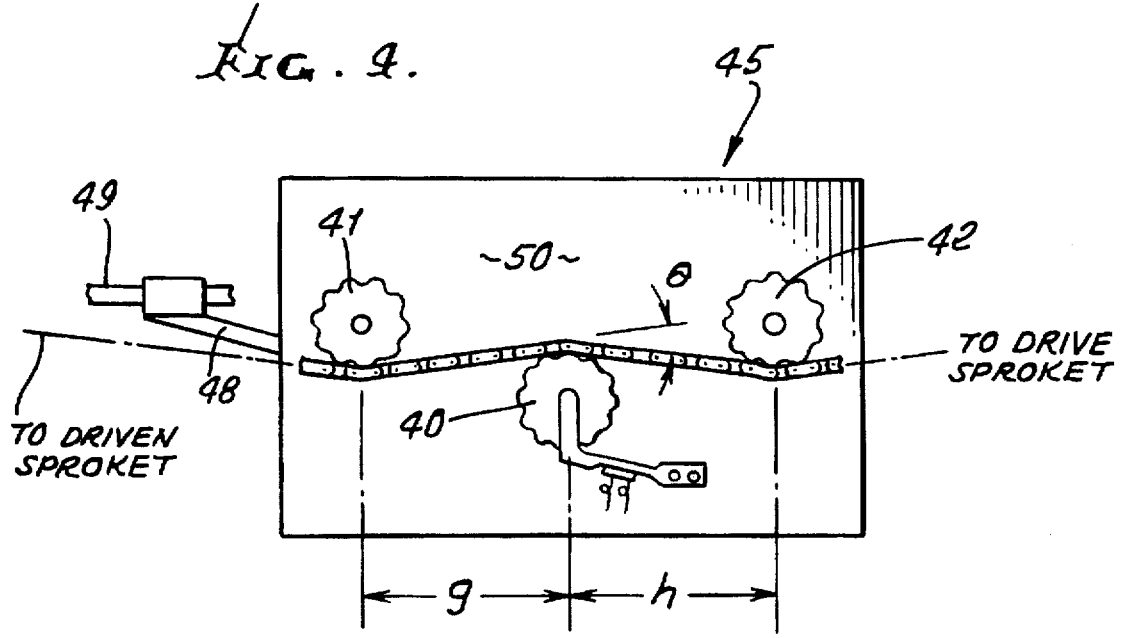
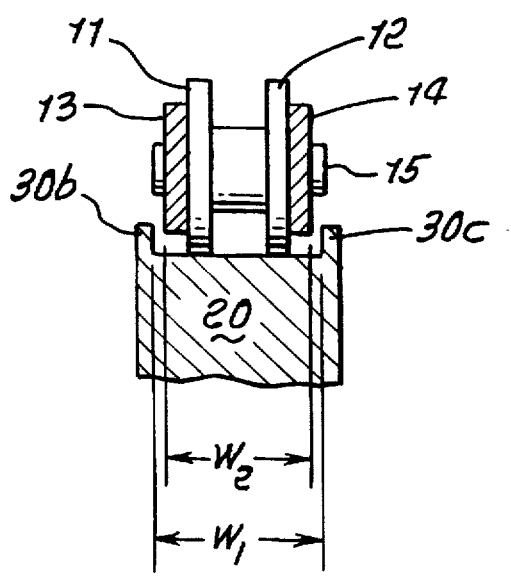
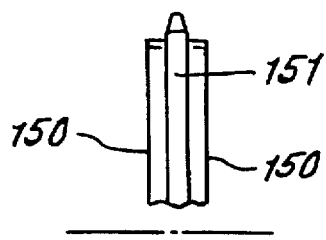
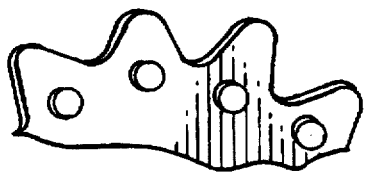

HIGH PERFORMANCE BICYCLE PROPULSION

BACKGROUND OF THE INVENTION

This invention relates generally to electrical power assisted vehicles, such as bicycles, employing chain drives; more particularly it concerns improvements in the sensing of tension in a chain delivering power from a first source to a vehicle propulsion means, such as a bicycle wheel, and the use of such sensing to control electrical power delivery to the vehicle propulsion means.

There is need for improvements in power delivery systems employing chains, as wherein power from two different sources is supplied to vehicle propulsion means. In particular there is need for improvements in such systems, where pedal delivered power is to be controllably assisted by electrically delivered power, and wherein the latter is to be controlled as a function of the former, as by sensing changes in pedal delivered power transmitted via a chain to the propulsion means, such as a bicycle wheel.

One example of such need results from problems encountered during use of a standard small sprocket employed as an idler to sidewardly divert the path of a power delivering tensioned chain. It is found that considerable noise and drag are created by such chain path diversion, even by a relatively small amount. These are consequences of the chain bending at the diverter, but more important is the fact that roller chain has links of finite size and so as the rollers contact and move around the idler the effective radius of the idler varies slightly.

SUMMARY OF THE INVENTION

It is a major object of the invention to provide improved apparatus and method meeting the above needs. Basically, one aspect of the invention concerns provision of an improved idler to engage and divert the chain path, the idler having a wavy or undulating periphery to engage edges of chain links. It is found that such an idler affords desired sensing of chain tension, with accompanying very low noise and low drag.

As will be seen, the improved "wavy" idler typically has means associated therewith to urge the idler toward the chain; in addition means is provided to determine or sense changes in side force F exerted by the chain on the wavy idler, and which is proportional to chain tension. Rate of idler rotation may then be employed with F to determine chain power transmission, as for use in controlling electrical power delivery from another source, for example to vehicle propulsion means.

An additional object is to provide a wavy periphery idler with chain link edge engaging surface width which exceeds the chain overall width. The idler surfaces may furthermore consist of plastic material, for contact with metal chain edges, to aid in noise and drag reduction. Chain centering or guiding means may be provided on the wavy idler.

A further object is to provide two additional wavy periphery idlers engaging the chain, the force F sensing idler located between the two additional idlers, for reasons as will appear. Auxiliary structure may typically mount all three idlers to have parallel axes of rotation; and such auxiliary mounting structure and the idlers may define an assembly which is freely movable sidewise and with the chain, but is retained against lengthwise movement with the chain.

Yet another object is to provide, in combination with a bicycle drive, the following:

a) a first pedal driven sprocket,
b) a first rear wheel driven sprocket, at the rear wheel hub,
c) a first chain meshing with the a) and b) sprockets, the improvement comprising
d) an electric drive motor on the bicycle,
e) an additional sprocket driven by the motor,
f) a second rear wheel drive sprocket, at the rear wheel hub,
g) a second chain meshing with the additional and second rear wheel drive sprockets,
h) and control means associated with the first chain to determine power delivery by that chain and to control operation of the motor in response to that determination,
i) whereby the motor adds propulsion power delivery to the rear wheel as a function of power delivery to the first chain.

As will appear, an override clutch may be provided at the rear wheel hub, operatively connected with the first and second rear wheel drive sprockets for allowing stoppage of rotation of the second rear wheel drive sprocket while the rear wheel rotates along with the first rear wheel drive sprocket. Also, gear shift means may be provided at the rear wheel hub to allow gear shifting of the drive from the first pedal driven sprocket.

As will also appear, the control means may typically include circuitry to effect power delivery by the motor to the rear wheel in substantial proportion to power delivery from the first chain to the rear wheel. Such substantial proportion may be about 1:1.

These and other objects and advantages of the invention, as well as the details of an illustrative embodiment, will be more fully understood from the following specification and drawings, in which:

DRAWING DESCRIPTION

FIG. 1 is a top plan view of a chain as used for transmitting power;

FIG. 2 is a side elevational view of the FIG. 1 chain entrained on a power transmitting sprocket, such as the pedal sprocket of a bicycle;

FIG. 3a is a section taken on lines 3a—3a of FIG. 3;

FIG. 3 is an enlarged side elevational view of a chain deviating "wavy" sprocket engaging the chain, as is also seen in FIG. 2;

FIG. 4 is a view of a multiple idler sprocket assembly engaging a chain;

FIG. 5 is a view showing chain link edge engagement with a wavy sprocket surface; and FIGS. 5a and 5b are fragmentary auxiliary views;

DETAILED DESCRIPTION

Figure 6:
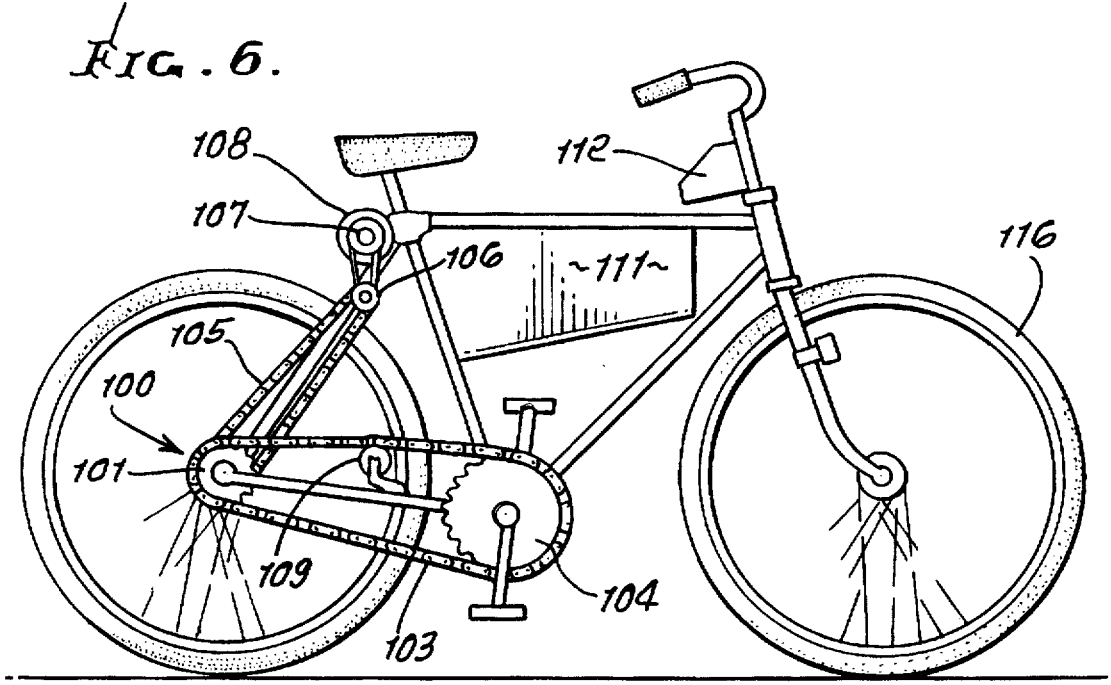
FIG. 6 is a side elevational view of a bicycle, using the FIG. 2 wavy sprocket device, as for example to control electrical drive assist.

Referring first to FIGS. 1 and 3, a typical power drive chain 10 includes pairs of like intermediate links 11 and 12, pairs of like side links 13 and 14, and pivots such as rivets 15 interconnecting the side links, via circular bores 16 and 17 through the links, the rivets located at equally spaced locations. The links typically have plate configuration, with intermediate link edges 11a and 12a presented inwardly and edges 11b and 12b presented outwardly, and side link edges 13a and 14a presented inwardly and edges 13b and 14b presented outwardly. The links 11 and 12 inner edges 11a and 12a are convex, as for example circular, and slidably ride on the surfaces 20a of like peripheral undulations formed by a "wavy" idler 20, as seen in FIG. 3.

Support means generally indicated at 21 in FIG. 2 supports the idler 20 to be yieldably urged (as by a spring 110) toward the chain 10, and means generally indicated at 22 is associated with the idler support means 21 for determining or sensing side force F exerted on the idler, and which is proportional to chain tension. Means 23 may also be associated with the idler to determine its rate of rotation R resulting from chain endwise travel; and a multiplying means 24 may have inputs as at 25 and 26 from the outputs of 22 and 23 to multiply values corresponding to F and R to determine power P. Power is transmitted by the chain, as from a power transmitting sprocket 30 having teeth 31 meshing with the chain as at gaps formed between the links, in known manner. A driven sprocket is shown at 34 engaging the chain in known manner, and the chain is tensioned between 30 and 34 in power transmitting use.

More specifically, cable or chain tension is commonly measured by forcing the cable laterally from its general longitudinal orientation to bend the cable by angle θ(see FIG. 2). The lateral force F is measured. The tension T is proportional to F, with the constant of proportionality being a known function of θ. For a bicycle chain-drive system, FIG. 3, the power P being transmitted by the chain 10 from the driving sprocket 30 in front, to the rear-driven sprocket 34 is ascertained by finding F that forces the chain to bend by an amount from a straight line connecting the tangent points on the front drive sprocket and rear driven sprocket, and noting the chain speed V from observing rotation speed of idler 20 and knowing the number of teeth. P=T×V, where T represents the measured tension above the preloaded tension. Idler 20 can be mounted so as to push the chain downward or upward.

The lateral force F typically can be monitored by a strain gauge on a spring arm 60 connecting the shaft of idler 30 to the bicycle frame 61, the arm bending to stretch the gauge, as the idler is pushed by the chain.

Relative to the bicycle and overall chain dimensions, idler 30 is essentially at a location such that its mounting to the frame by a short beam permits it to move slightly, perpendicular to the chain, bending the beam proportionally to F, so the strain gauge that senses beam bending provides the F measurement. Tension T=F×2 sin θ/2.

There is a fundamental problem: with a standard chain of ½ inch pitch, an ordinary idler needs to be too large to be practical on a standard bicycle, unless θ is permitted to be inconveniently large; otherwise noise and drag are excessive. The wavy idler 30 disclosed herein resolves the problem, permitting a conveniently small angle θ and relative small idler to provide a continuous measurement of F, with only low noise and low drag.

The wavy idler 30 does not have the conventional sprocket teeth that interact with the chain rollers, but instead is provided with a wavy perimeter shape that fits rather well the chain's exterior. The wavy idler is especially valuable for monitoring the tension of a moving chain by measurement of the straightening force on the idler caused by chain tension, because the wavy idler permits low drag and noise to be achieved with a small chain bending angle with an idler of desirably relatively small size.

The toothed sprockets designed for the transmission of relatively high power for bicycles as via roller chain are found to have undesirable features when applied to the very different task of providing a small idler for bending a chain through a small angle efficiently (low drag), and quietly, so that the tension can be efficiently found from the bending force.

Roller chain consists of a series of links, normally of ½ inch pitch as between successive roller axes. When the number of degrees between sprocket teeth (360°/N where N is number of sprocket teeth) is more than about twice the chain bend angle θ, the difference in effective radius, as the sprocket contacts a roller, compared to when contact is made midway between rollers, causes significant undesirable force variations and chain trajectory length variations. Noise and drag become unacceptably large. For a 24-tooth sprocket (nominal diameter 3.8 inches), the chain bend angle should equal or exceed 7.5°. This is an inconveniently large sprocket for mounting, producing an inconveniently large angle θ for keeping turning force and chain roller drag relatively low—and even in this case the noise and drag may be unacceptable. If θ is decreased 50%, N needs to be doubled.

The wavy roller or idler 30 as disclosed herein contacts a greater portion of the chain than does a sprocket connecting only every ½ inch to a roller. The contact is not perfect, and the wavy idler can slide and oscillate a bit (a small portion of chain pitch) tangentially, but relative motion is smaller than for the toothed sprocket, and the momentary speeding up and slowing down of a small, light idler 30 causes little loss of energy. Such an idler may have a low friction wavy plastic surface to engage the chain.

Where a 12-tooth (30° between teeth) sprocket would require θ to be at least 15° to avoid severe noise and drag, a similarly sized 12-wave wavy idler would work well at shallower chain bend θ angle, such as 3°. For a chain tension of 200 lbs, θ=15° (for the toothed idler sprocket) and puts a 52 lb. chain bend force on the idler, with correspondingly large varying forces because of the Z motion (sprocket bodily sideward movement), and the roller internal friction drags associated with 15° chain bending and some roller/ teeth sliding under 200 lb. tension. For the wavy (no sprocket teeth) idler, at θ=3°, the chain bend force is only 10.4 lbs., and the roller internal friction drags only 20% of the sprocket case. The Z-motion effects, and link/wave sliding effects, are indeterminate because they depend so intimately on θ and the exact wave shape, but will be significantly smaller than for the sprocket case. The wavy idler is therefore superior to an ordinary sprocket for creating an efficient human power sensor system, and is useful for use in other applications where the tension of a moving chain must be monitored.

The basic wavy idler preferably has a width exceeding the chain width (see FIG. 5) so that contacts are always made with edges of the chain. If the chain moves sideways out of its plane, the wavy idler should be wide enough to accommodate all such excursions, or the wavy idler can be caused to move sideways with the chain by having locating teeth that fit loosely inside the chain sides without contacting rollers, or locating teeth or flanges that go outside both sides of the chain. In FIG. 5, the wavy idler has widthwise spaced barriers 30b and 30c between which the chain is loosely confined. The inner surfaces of the barrier may be coated with low friction material.

A normal toothed sprocket can have the equivalent of wavy idlers helping it to obtain some of the wavy idler benefits by adding disks integral with the sprocket, and that contact portions of the chain edges. See FIG. 5a with discs 150 at opposite sides of sprocket 151. The idler protruding portions contacted are midway between sprocket teeth. See FIG. 5a. To some extent, and from the standpoint of chain bending geometry, as the chain skirts the sprocket perimeter it acts somewhat like a ¼ inch pitch change instead of ½ inch pitch, and so shallower chain bend angles become practical. The effect of the disks contacting the chain midway between the roller contact points can be obtained by protuberances on the sprocket (see FIG. 5b).

Note that all chains do not have identical geometry, for alternate links.

In other words, the exact height and shape of region "e" and region "b" as seen in FIG. 2 may not be identical. A compromise for the wavy idler is to fit the lower of the shapes in the two regions and accept a slight sloppiness in its contact with the lengthwise adjacent links. An alternative is to tailor the shapes of alternate waves on the wavy idler to fit alternate links on the chain. Chains have even numbers of links, and the wavy idler with an even number of cycles can be phased so its varying alternate waves always fit the edges of the varying alternate links.

Another wavy idler approach is to start with a plastic wavy idler and put specially shaped teeth on it along the center. In other words, the general feature is that of FIG. 5a, but instead of starting with a normal sprocket and adding side discs that are a wavy idler feature, provide a normal wavy idler and add special teeth along its middle that are not providing resting slots for the rollers (the rollers will rest on the wavy idler) but the teeth can help minimize or optimize the slight slippage along the periphery as the distorting (in angle) chain cannot perfectly match the shape of the wavy idler throughout all the contact loci.

For simplicity, the discussion so far has focused on standard ½ inch bicycle chain; however, the concepts herein pertain to all types and sizes of roller chains. There are also many other chains and belts available for transmitting power. For example, a popular type is a toothed belt. In such a case, the teeth tend to be close together, and although a tiny wavelength wavy idler could be used, a better approach would be to put the θ bend in from the smooth side and use a quiet, low drag smooth-surfaced idler. For other link shapes outside of normal roller chain configuration, the wavy idler concept can be adapted.

If a derailleur on drive or driven sprockets causes chain 10 to move out of the plane as depicted in FIG. 3, the system of FIG. 4 provides a practical way to obtain the force measurement.

T is found from the force F measured at any of the three idlers, as long as the correct corresponding θ angle value is used. The most desirable form is to measure F for idler 40, the idler with the most positively defined θ. With no derailleur, idlers 41 and 42 are needed and idler 42 becomes the driving sprocket while idler 41 becomes the driven sprocket.

The geometry of assembly 45 in FIG. 4, involving sizes and positions of three idlers (41, 42, and 43) can be refined in accord with the later discussion of the wavy idler. An especially practical configuration uses a small "g" dimension but a large "h" dimension. The bend angle θ at idler 41 and idler 40 then become rather similar, and idler 40 and idler 41 will have the same number of protrusions (i.e. for the same idler diameters). The vertical load on idler 42, with its much shallower chain bend angle, is so small that a slide block (plastic, such as TEFLON or DELRIN) can be substituted for idler 42 without an unacceptable drag penalty to the whole system. Otherwise, idler 42 operating at the small chain bend angle would have to be larger than desired. Sharp (1896) clarifies the problem of the variation in effective radii of an idler when the idler is small and the chain distortion angle small.

A further feature of the system shown in FIG. 4 is that the distance between the chain contact points (where chain bend is θ/2) should have the chain connecting idler 41 at a tooth when the chain connection at idler 40 is ¼ inch (½ a chain link) further along. The effective radius of a sprocket or idler changes as the finite links travel by, as for example due to metallic chain "stretch" over time requiring small variations of chain length and the speed up or slow down of idlers or sprockets. There is benefit, although small, to minimizing the effective radius of idler 41 when the radius of idler 42 is near maximum, so as to lessen the overall chain effective length variation.

Assembly 45 that holds the three idlers (40, 41, and 42 in position) maintains its appropriate location between driving and driven sprockets as by means of a link 48 extending forward from bracket 49. The hinging of the link between frame 49 and plate 50 is such that it keeps assembly 45 always in a vertical plane, while letting it move in all other directions to accommodate the changing orientation of the chain as when derailleurs are operated.

Another feature that can be introduced to FIGS. 1 or 2 is to permit the position of the idler to vary with F. Rather than fixing position (and thus θ) and measuring F, F is fixed and lateral displacement is measured and hence F. Another compromise between the two limit cases, causes θ to be large when T (and P) are small, whereas θ (and F) are caused to be relatively small when T and P are large and the rider is most concerned about efficiency.

Measurement of chain speed is readily accomplished, for example, as by an electromagnetic pickup that provides one or more pulses for every 360° rotation of any idler. The pulse rate is proportional to chain speed. The system is analogous to the measurement of wheel speed by a standard bicycle electromagnetic speedometer.

The concepts disclosed herein are in terms of bicycle chain and a bicycle power system. However, the underlying concepts are valid and useful with the chain bent upward or downward, and for other chain or belt-drive systems.

As contemplated herein, tension T, or power P, is instantaneously derived for indication to the rider or for controlling a power-assist device. In certain circumstances, some averaging of the signal over time may be desired. Note that T and P will move from higher to lower levels approximately every ¼ second for pedaling at 60 rpm, with two legs. There can be advantages in a laboratory or in the field to display and use the instantaneous information in a way that suggests to the rider or user differences between operation of the left and right legs, or the smoothness of spinning of either or both legs. In a system using arms and legs, in various in-phase and out-of-phase combinations, the instantaneous display (for example as a function of limb position) can provide useful information. The information is clearest as the operator uses one limb at a time. In a typical real-time display for a bicyclist, a plot of tension (or power) versus time is repeated every 360° rotation of the crank set, triggered by a magnetic pickup as one crank passes a particular reference point.

"Wavy" idler structural and use features of importance include the following:

1. Chain tension T is ascertained by means of a single idler in fixed location between front and rear sprockets on a nonderailleur bicycle, the chain diverted by and angle θ, for sensing the force to cause this diversion that is proportional to chain tension T.

2. The rotation rate of the idler is monitored to provide chain speed V, derived with power (being transferred by the chain from a powered sprocket to a driven sprocket) multiplying electronics that provide a signal that is the product of T times V. P=T×V, if there is no chain pretension.

3. Where there is pretension Ta, then P=(T−Ta)×V, with Ta monitored and incorporated manually or automatically in the electronics backup, with (T−Ta)×V calculated continuously.

4. A three-idler assembly is positioned flexibly on a bicycle chain so the idler axes remain parallel to the drive sprocket axis; but the assembly can move in all other directions, with the middle idler sensing force proportional to chain tension T.

5. Chain speed is monitored by idler rotation rate, the power being P=T×V if there is no preload.

6. Where there is pretension Ta, a corresponding value is recorded so that the power (T−Ta)×V can be calculated continuously.

7–12. For any of the above (1–6) the idler is permitted to move approximately under load against a spring, so T is computed by idler position taking into account the varying chain bend angle θ.

13. A wavy idler is provided, with the chain exterior resting against the idler undulating peripheral wave shape that is closely matched to the chain exterior shape, and the chain is diverted through a small angle to ascertain chain tension T from monitoring the diverting force on the wavy idler.

14. The idler is made of plastic rather that metal; or it can be made of metal and plastic, or metal with a plastic surface. It may be provided with a long wear surface coating.

15. The wavy idler may include teeth (to mesh with the chain) as well as having a wavy periphery that nearly matches the chain's exterior. The "waves" may be like sine waves, or approximately such waves.

16. Fewer than 20 waves are provided on the idler periphery, causing chain bending of less than 5 degrees.

17. Fewer than 12 waves are provided on the idler periphery, causing chain bending of less than 7 degrees.

18. Wavy idlers can be employed for all three idlers of the three idler system described herein or for two idlers where the third idler is replaced by a positioning slide.

19. The distance from the middle idler to the rear idler is less than one third the distance from the middle idler to the front idler or positioning slide.

20. The tension T or power P is recorded or displayed on a screen vs. time or crank angle sequentially for each 360° angle of pedal sprocket rotation.

21. Any T or P signal derived from the power on an idler diverting the chain can be displayed as an average of several cycles rather than instantaneously.

Figure 8:
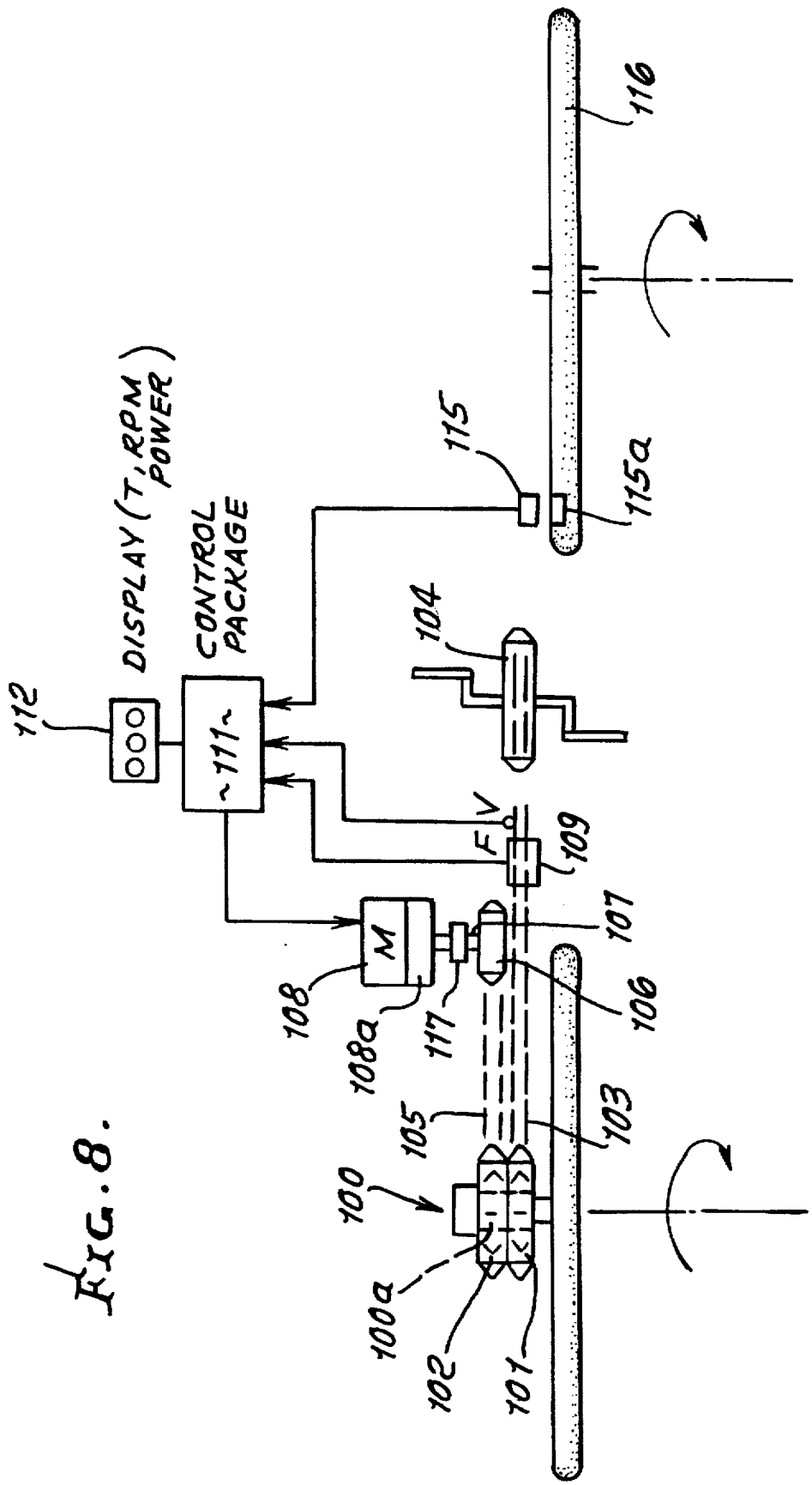
FIG. 8 is a schematic diagram.

Referring now to FIG. 6, and also to the schematic of FIG. 8, they show the main components of an electric assist system integrated into a bicycle, the wavy idler being incorporated as will appear.

Rear hub 100 has an internal gear shift 100a, and two driven sprockets 101 and 102, one powered by drive chain 103 that entrains the sprocket 104 attached to the pedals. The other driven sprocket 102 is powered by chain 105 that connects via a sprocket 106 to a shaft 107 driven by electrical motor 108 (connected at 108a to 107 as by gear reduction, belt, or chain, reducing RPM). The wavy idler 109 diverts the drive chain from a straight course or stretch and, by the force exerted on 109, as by a spring 110 seen in FIG. 2, causes this diversion, and monitors chain tension. If chain pretensioning is large, the pretension force must be subtracted from total chain tension to derive rider-produced tension, and thus permit the electric augmentation or power, or torque at the rear hub, to be related to human power. Batteries, controller, recharger, and selection buttons are on or in a controller package 111 that is easily removed from the bicycle. Information is displayed to the rider by a handlebar-mounted display 112. See also FIG. 6.

The power from the electric system delivered to the rear sprocket is typically proportional to the human power being exerted by the rider. The constant of proportionality is 1:1 for many applications, where this limit is dictated, but optionally elsewhere other proportionality factors can be used, such as 2:1 or 3:1. For safety, and for regulatory compliance, the power electronics in 111 is configured so that above a certain bicycle speed, say 20 km/hr., associated by bicycle speed unit 115 operating off magnetic pickup 115a on front wheel 116 the power constant of proportionality is decreased below that selected, and becomes zero at another speed, say 25 km/hr.

Note that the operator does not pedal and produce propulsion power when operating the bicycle brakes and so there is no auxiliary power or propulsion during braking, with the present proportional power system.

A one-way clutch 117 is included either in the electric power driven sprocket at the rear hub, or at shaft 107 as shown, or at the motor output shaft, so that the motor will not be driven by the bike. Thus noise and drag are eliminated when power is not being applied by the rider.

Figure 7:
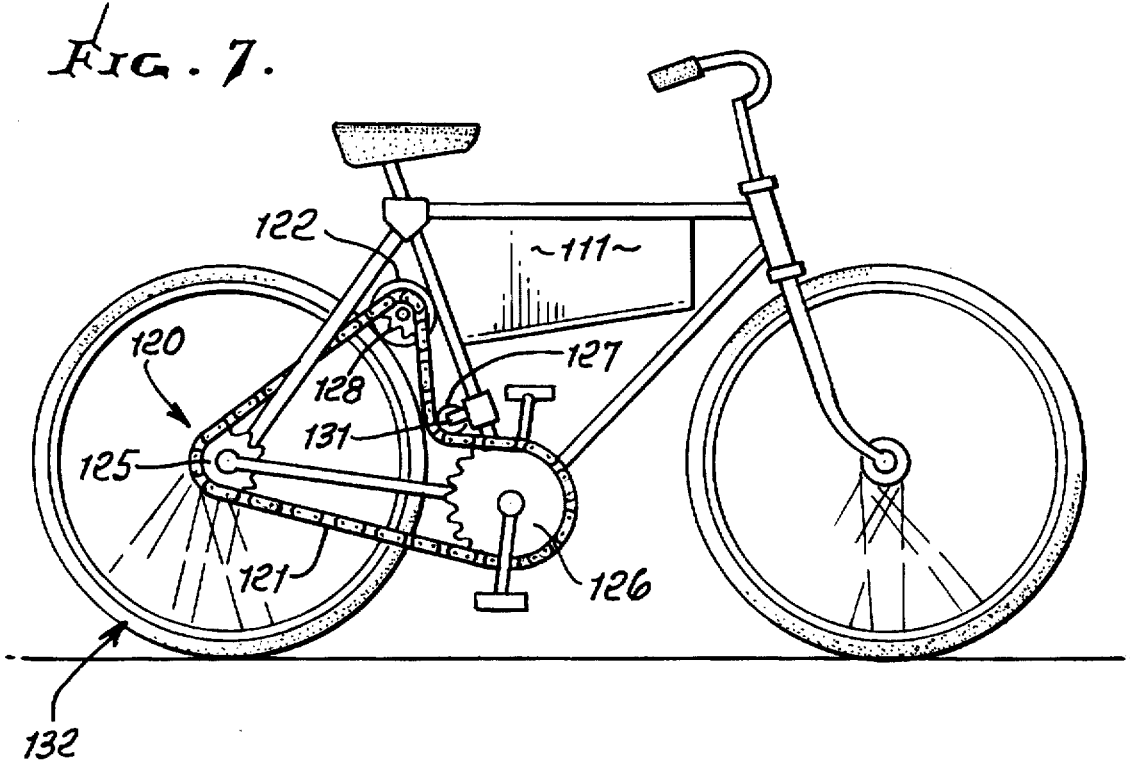
FIG. 7 is a view like FIG. 6, but showing a modification.

FIG. 7 shows the single chain version. Here the rear hub 120 has only one sprocket 125 and chain 121 (which simplifies removal of the wheel 132 for tire repair and replacement). The electric motor 122, with appropriate RPM reduction by gearbox, chain, or both, powers sprocket 125, via chain 121, and the rider powers pedal sprocket 126. The wavy idler 127 between 126 and motor sprocket 128 serves as a human power sensor by measurement of the chain deviating force exerted on the wavy sprocket by the chain (using a strain gauge 131) considering the particular geometry of the system. The portion of the chain 121 between motor sprocket 128 and 125 transmits the total power, human and electric, but the portion between 126 and 128 transmits only the human power portion, and so the force on idler 127 can be used to assess human power. Note that the chain bend angle θ at 127 can be very flat, and the wavy idler becomes a desirable idler to use. Alternatively the chain bend angle can be large, which helps connect the chain over more teeth on 128 and 126 and so inhibits slipping or skipping on these sprockets. With a large chain angle the force on the idler and its mount will often be large, and an ordinary bicycle sprocket can suffice if it has a moderately large diameter.

Important features of the system are as follows:

1. An electric assist bicycle incorporates:
   both electric power and human power to be delivered to sprockets connected directly to the rear axle
   the human power, or torque produced by the human power on one rear sprocket, is ascertained by the force on a frame-mounted idler acting to divert the drive chain between the pedaled sprocket and rear sprocket, from a straight line to a given amount of chain bend the mechanical power delivered by the electrical drive system to the other rear sprocket is adjusted by a controller, utilizing (or as a function of) the human power sensor output to the controller, to be proportional to the human power a removable container holding batteries, power electronics, controller, recharger, battery state of change indicator, and control selection buttons, mounted on a bicycle instrument display mounted on the bicycle handlebars.

2. The idler is a wavy idler.

3. The constant of proportionality determined by the ratio K of electrically-supplied power to a rear sprocket to the supplied human power supplied to a rear sprocket, is 1:1.

4. A vehicle speed sensor is employed with the controller decreasing this ratio K to zero over some interval of bicycle speed, such as between 20 and 25 km/hr.

5. The ratio K of proportionality is selectable by the rider.

6. The system includes the option of smooth power, not dependent on human power, but with "power off" switches that operate with each hand brake lever operation so the power is never on during braking. Such a unit does not require a human power or chain tension sensor.

8. Any of 1–7 above where only one chain is employed.

We claim:

1. For use in determination of chain transmitted power, the combination comprising
    a) a tensioned chain having a succession of chain links with undulating edges, certain of said links being side links,
    b) an idler supported to be driven in rotation by the chain, and having an undulating perimeter surface, said idler having an axis,
    c) certain of said chain undulating edges engaging portions of said idler undulating perimeter surface, whereby the chain changes direction as it travels lengthwise relative to the idler and rotatably drives the idler,
    d) said idler undulating perimeter surface having outwardly convex substantially sine wave configuration surface portions in radial alignment with and radial engagement with said chain side links, the width of said idler undulating perimeter surface exceeding the width dimension between outer surfaces of the side links.

2. The combination of claim 1 including means associated with the idler to urge the idler relatively toward the chain.

3. The combination of claim 1 including means supporting the idler to be urged toward the chain.

4. The combination of claim 3 including means associated with said idler supporting means for determining side force F exerted by the chain on the idler which is proportional to chain tension.

5. The combination of claim 1 including means associated with the idler to determine its rate R of rotation.

6. The combination of claim 4 including means associated with the idler to determine its rate R of rotation.

7. The combination of claim 6 including multiplying means for multiplying values corresponding to F and R to determine power transmitted by the chain, for use in controlling power delivery to auxiliary apparatus.

8. The combination of claim 1 including driving and driven sprockets entraining the chain, the idler engaging the chain at a location in the chain travel path between said driving and driven sprockets.

9. The combination of claim 7 including means to effectively subtract chain pre-tension in determination of chain transmitted power.

10. The combination of claim 1 wherein said idler consists of one of the following:
    i) metal
    ii) plastic
    iii) metal and plastic
    iv) semi-flexible material.

11. The combination of claim 1 wherein the idler also has teeth that mesh with openings defined by the chain links.

12. The combination of claim 1 wherein said idler undulating surface has width $W_1$ and said chain has overall width $W_2$, where $W_1 > W_2$.

13. The combination of claim 1 wherein said chain change of direction is less than 7°.

14. The combination of claim 3 wherein said chain change of direction is less than 5°.

15. In combination,
    a) a chain having side plate links with edges, the chain being tensioned, certain of said links being side links,
    b) a first idler having a wavy periphery engaged by the chain side plate link edges, said idler having an axis,
    c) the idler forcibly diverting the chain sidewise so that chain extent leaving the idler is directed at a small angle relative to chain extent approaching the idler,
    d) said idler wavy periphery having outwardly convex substantially sine wave configuration surface portions in radial alignment with said chain side links, the width of said idler wavy periphery exceeding the width dimension between outer surfaces of the said side links.

16. The combination of claim 15 including two additional wavy periphery idlers engaging the chain, the first idler located between said two additional idlers.

17. The combination of claim 16 including structure mounting all three idlers to have parallel axes of rotation.

18. The combination of claim 15 wherein
    e) there being two additional idlers engaging the chain, the first idler located between said two additional idlers,
    f) and wherein at least one of said two additional idlers is a rotary idler.

19. The combination of claim 15 wherein the idler has fewer than 20 waves located generally circumferentially of the idler.

20. The combination of claim 16 wherein the distance from the first idler to one additional idler is g and the distance from the first idler to the other additional idler is h, wherein $h > g$.

21. The combination of claim 15 including sprocket teeth on the wavy idler to mesh with chain defined openings between chain side links.

22. In combination,
    a) a chain having side plate links with edges, the chain being tensioned, certain of said links being side links,
    b) a first idler having a wavy periphery engaged by the chain side plate link edges, said idler having an axis,
    c) the idler forcibly diverting the chain sidewise so that chain extent leaving the idler is directed at a small angle relative to chain extent approaching the idler,
    d) there being two additional wavy periphery idlers engaging the chain, the first idler located between said two additional idlers,
    e) there being structure mounting all three idlers to have parallel axes of rotation, f) and wherein said mounting structure and idlers define an assembly which is freely movable sidewise and with the chain, but is retained against lengthwise movement with the chain.

23. In combination with a bicycle drive that includes
a) a first pedal driven sprocket,
b) a first rear wheel driven sprocket, at the rear wheel hub,
c) a first chain meshing the said a) and b) sprockets, said chain having side plate links with edges, the improvement comprising
d) an electric drive motor on the bicycle,
e) an additional sprocket driven by the motor,
f) a second rear wheel drive sprocket, at the rear wheel hub,
g) a second chain meshing with said additional and second rear wheel drive sprockets,
h) and control means associated with the first chain to determine power delivery by that chain and to control operation of the motor in response to said determination,
i) whereby the motor adds propulsion power delivery to the rear wheel as a function of power delivery to the first chain,
j) said control means including a first chain deviating means and an associated deviation force sensor, said deviating means comprising an idler having a wavy periphery,
k) said idler wavy periphery having outwardly convex substantially sine wave configuration surface portions in radial alignment with said chain side links, the width of said idler wavy periphery exceeding the width dimension between outer surfaces of the said side links.

24. The improvement of claim 23 wherein said sensor comprises a strain gauge.

25. The improvement of claim 23 wherein the chain is deviated by an angle $\theta$ where $\theta$ is the angle between the direction of travel of the chain extent approaching the idler, and the direction of travel of the chain extent leaving the idler, wherein $\theta$ is less than 7°.

26. The improvement of claim 23 including an override clutch at the rear wheel hub, operatively connected with the first and second rear wheel drive sprockets for allowing stoppage of rotation of the second rear wheel drive sprocket while the rear wheel rotates along with the first rear wheel drive sprocket.

27. The improvement of claim 23 including a gear shift means at the rear wheel hub to allow gear shifting of the drive from the first pedal driven sprocket.

28. The improvement of claim 23 including a one-way clutch operatively connected in the drive from the electric motor to the rear wheel, via the e) and f) sprockets.

29. The improvement of claim 23 wherein said control means includes circuitry to effect power delivery by the motor to the rear wheel in substantial proportion to power delivery from the first chain to the rear wheel.

30. The combination of claim 29 wherein said substantial proportion is about 1:1.

31. The combination of claim 23 including a battery power means carried by the bicycle and electrically connected to said motor.

* * * * *